(12) United States Patent
Garrison et al.

(10) Patent No.: US 7,711,690 B1
(45) Date of Patent: May 4, 2010

(54) DUAL SOURCE REMITTANCE PROCESSING

(75) Inventors: David Lee Garrison, Columbus, OH (US); Patricia A. Kight, Alpharetta, GA (US); Brad Perkins, Dublin, OH (US); Cheryl Lynn Ward, Hilliard, OH (US); Mary Elizabeth Lawson, Dublin, OH (US); Amy Lynn Kerin, Delaware, OH (US)

(73) Assignee: Checkfree Corporation, Norcross, GA (US)

( * ) Notice: Subject to any disclaimer, the term of this patent is extended or adjusted under 35 U.S.C. 154(b) by 0 days.

(21) Appl. No.: 09/010,193

(22) Filed: Jan. 21, 1998

(51) Int. Cl.
*G06F 17/00* (2006.01)
(52) U.S. Cl. .................. 707/102; 707/100; 707/101; 705/40
(58) Field of Classification Search .................. 705/34, 705/35, 39, 40, 43, 44, 26; 707/100–102
See application file for complete search history.

(56) References Cited

U.S. PATENT DOCUMENTS

| | | | |
|---|---|---|---|
| 4,774,664 A | 9/1988 | Campbell et al. | |
| 4,871,903 A | 10/1989 | Carrell | |
| 4,908,850 A | 3/1990 | Masson et al. | |
| 4,947,028 A | 8/1990 | Gorog | |
| 5,153,907 A | 10/1992 | Pugh et al. | |
| 5,197,094 A | 3/1993 | Tillery et al. | |
| 5,208,593 A | 5/1993 | Tong et al. | |
| 5,220,501 A | 6/1993 | Lawlor et al. | 364/408 |
| 5,222,018 A * | 6/1993 | Sharpe et al. | 705/30 |
| 5,283,829 A | 2/1994 | Anderson | 380/24 |
| 5,298,731 A | 3/1994 | Ett | |
| 5,325,290 A | 6/1994 | Cauffman et al. | 364/401 |
| 5,326,959 A | 7/1994 | Perazza | 235/379 |
| 5,336,870 A | 8/1994 | Hughes et al. | 235/379 |
| 5,383,113 A | 1/1995 | Kight et al. | 364/401 |
| 5,420,405 A | 5/1995 | Chasek | 235/379 |
| 5,432,326 A | 7/1995 | Noblett, Jr. et al. | |
| 5,465,206 A * | 11/1995 | Hillt et al. | 705/40 |
| 5,504,677 A | 4/1996 | Pollin | |
| 5,612,889 A * | 3/1997 | Pintsov | 700/226 |
| 5,649,114 A * | 7/1997 | Deaton et al. | 705/14 |

(Continued)

FOREIGN PATENT DOCUMENTS

EP    0649105    4/1995

(Continued)

OTHER PUBLICATIONS

"10043247 Refocus Search Results Remittance Payment Processing with Account Scheming and/or Validation." PR Newswire, Dec. 10, 1997 (21 pages).

(Continued)

*Primary Examiner*—Sana Al-Hashemi
(74) *Attorney, Agent, or Firm*—Sutherland Asbill & Brennan LLP

(57) ABSTRACT

A method and apparatus for electronically processing bill payment requests where respective sets of payment requests are received electronically from a plurality of independent sources, each set of payment requests corresponding to an associated set of payers requesting payments to a plurality of payees. The payment requests are processed at a single remittance processing system having a database including payee information for each of the plurality of payees to generate payment directions for paying the plurality of payees in accordance with the processed payment requests.

18 Claims, 7 Drawing Sheets

U.S. PATENT DOCUMENTS

| | | | | |
|---|---|---|---|---|
| 5,649,117 A * | 7/1997 | Landry | | 380/25 |
| 5,677,955 A | 10/1997 | Doggett et al. | | |
| 5,684,965 A * | 11/1997 | Pickering | | 705/34 |
| 5,699,528 A | 12/1997 | Hogan | | 395/240 |
| 5,707,286 A | 1/1998 | Carlson | | |
| 5,717,868 A | 2/1998 | James | | |
| 5,727,249 A | 3/1998 | Pollin | | 705/40 |
| 5,740,549 A * | 4/1998 | Reilly et al. | | 705/14 |
| 5,754,938 A * | 5/1998 | Herz et al. | | 345/27 |
| 5,781,654 A | 7/1998 | Carney | | |
| 5,819,291 A | 10/1998 | Haimowitz et al. | | |
| 5,826,165 A * | 10/1998 | Echeita et al. | | 345/27 |
| 5,826,245 A | 10/1998 | Sandberg-Diment | | |
| 5,835,087 A * | 11/1998 | Herz et al. | | 345/27 |
| 5,873,072 A | 2/1999 | Kight et al. | | |
| 5,880,446 A | 3/1999 | Mori et al. | | |
| 5,909,670 A * | 6/1999 | Trader et al. | | 705/14 |
| 5,915,243 A * | 6/1999 | Smolen | | 705/14 |
| 5,920,847 A * | 7/1999 | Kolling et al. | | 705/40 |
| 5,920,848 A | 7/1999 | Schutzer et al. | | |
| 5,933,811 A * | 8/1999 | Angles et al. | | 705/14 |
| 5,953,427 A | 9/1999 | Cordery et al. | | |
| 5,956,700 A * | 9/1999 | Landry | | 705/40 |
| 5,966,698 A | 10/1999 | Pollin | | |
| 5,978,780 A * | 11/1999 | Watson | | 705/40 |
| 6,021,202 A * | 2/2000 | Anderson et al. | | 705/39 |
| 6,026,385 A | 2/2000 | Harvey et al. | | |
| 6,029,150 A * | 2/2000 | Kravitz | | 705/30 |
| 6,035,285 A * | 3/2000 | Schlect et al. | | 705/30 |
| 6,070,150 A * | 5/2000 | Remington et al. | | 705/34 |
| 6,119,104 A | 9/2000 | Brumbelow et al. | | |
| 6,119,106 A * | 9/2000 | Mersky et al. | | 705/40 |
| 6,311,170 B1 * | 10/2001 | Embrey | | 705/40 |
| 6,327,577 B1 * | 12/2001 | Garrison et al. | | 705/40 |
| 6,438,527 B1 * | 8/2002 | Powar | | 705/40 |
| 6,968,319 B1 * | 11/2005 | Remington et al. | | 705/40 |
| 7,490,063 B2 | 2/2009 | Garrison et al. | | |
| 2001/0001148 A1 | 5/2001 | Martin et al. | | |
| 2002/0026394 A1 * | 2/2002 | Savage et al. | | 705/34 |

FOREIGN PATENT DOCUMENTS

| | | |
|---|---|---|
| EP | 782108 | 12/1996 |
| EP | 780807 | 6/1997 |
| GB | 2283588 | 5/1995 |
| JP | 63268086 | 4/1988 |
| JP | 2001-556 | 1/1990 |
| WO | 97/34243 A1 | 9/1997 |
| WO | 9734243 | 9/1997 |
| WO | 99/56219 A1 | 11/1999 |
| WO | 9956219 | 11/1999 |
| WO | 00/08612 A1 | 2/2000 |
| WO | 0008612 | 2/2000 |

OTHER PUBLICATIONS

Supplemental Notice of Allowance dtd Dec. 19, 2008 for related U.S. Appl. No. 10/043,247 (filed Jan. 14, 2002) which is a continuation of U.S. Appl. No. 08/994,047.

Non-Final Office Action mailed Jun. 2, 2009 for related U.S. Appl. No. 12/361,289 (filed Jan. 28, 2009), which is a continuation of U.S. Appl. No. 10/043,247.

"New E-Commerce Management Solution from i-bill," PR Newswire, Dec. 10, 1997 (3 pgs.) [ibill=Internet Billing Co. Ltd.].

"How Combined Billing Could Save Utilities Money." Phillipos Business Information, Inc., Jan. 21, 1993, vol. 4, No. 1 (cited by Examiner in May of 2001 in related U.S. Appl. No. 08/994,047).

Taylor, Jocelyn P. "Check Fraud: Preventative Measures for Businesses." Journal of Cash Management, Jan./Feb. 1992, pp. 34-38, vol. 12, No. 1.

Final Office Action dtd Dec. 13, 2007 for related U.S. Appl. No. 10/043,247 (filed Jan. 14, 2002) which is a continuation of U.S. Appl. No. 08/994,047.

Final Office Action dtd Dec. 21, 2007 for related U.S. Appl. No. 10/443,864 (filed May 23, 2003).

Notice of Allowance dtd Oct. 6, 2008 for related U.S. Appl. No. 10/043,247 (filed Jan. 14, 2002) which is a continuation of U.S. Appl. No. 08/994,047.

Anonymous, "Industry Protests Curb US Routing Number Reforms", Cash Management News, Jul./Aug. 1994, n101, pp. 1-2.

Bruce Zagaris and Scott B. MacDonald, "Money Laundering, Financial Fraud, and Technology: The Perils of an Instantaneous Economy", The George Washington Journal of International Law and Economics, Washington: 1992, vol. 26m Iss. 1: pp. 1-32.

Declaration by Mary Elizabeth Lawson, executed in Oct. 2006, describing remittance-related payment processing capabilities prior to Dec. 19, 1996.

Notess, Greg et al., "On The Nets: Internet Ready Reference Resources," [Downloaded from PROQUEST]. vol. 19, No. 2, Apr./May 1996, pp. 88-91.

"Postalsoft Inc., Delivers Address-Correction Tool," American Banker [Downloaded from PROQUEST]. vol. 159, No. 88, May 9, 1994, p. 16A [printed pp. 1-2].

"1995 Software Guide: Conveying the message faster, more efficiently," Direct Marketing [Downloaded from PROQUEST]. vol. 58, No. 2, Jun. 1995. p. 46-[printed pp. 1-10].

"11-digit Zip Code Causes Concern," Mar. 1993, Direct, p. 16.

Pavely, Richard W., "Automation brings changes to USPS," Jan. 1993, Office, v117n1, p:42.

"History of the U.S. Postal Service: 1775-1993," Downloaded from Internet: <URL: www.usps.com/history/history/his3_5.htm> [retrieved on Jul. 30, 2002].

"Communications in Managing Modern Payment Systems," Management Accounting, Jul./Aug. 1997, vol. 75, No. 7, London.

"The Card Industry Cools Its Heels Waiting for a Fraud-Busting Code," Credit Card News. The Gale Group, May 1, 1993, vol. 5, No. 26, The Gale Group.

"SSN Verifier Another Step to Stemming Fraud," Item Processing Report, The Gale Group Newsletter DB, Mar. 31, 1994, vol. 5, No. 6. The Gale Group.

* cited by examiner

DUAL SOURCE REMITTANCE PROCESSING

CROSS-REFERENCE TO RELATED APPLICATIONS

This Application is related to U.S. application Ser. No. 08/994,047, filed Dec. 19, 1997, and entitled AN ELECTRONIC BILL PAYMENT SYSTEM WITH MERCHANT IDENTIFICATION (now U.S. Pat. No. 7,296,004), U.S. application Ser. No. 08/994,363, filed Dec. 19, 1997, and entitled AN ELECTRONIC BILL PAYMENT SYSTEM WITH ACCOUNT RANGING, and U.S. application Ser. No. 08/994,046, filed Dec. 19, 1997, and entitled AN ELECTRONIC BILL PAYMENT SYSTEM WITH ACCOUNT NUMBER SCHEMING (now U.S. Pat. No. 6,327,577).

FIELD OF THE INVENTION

The present invention relates to electronic commerce. More particularly, the present invention relates to an improved electronic bill payment system.

BACKGROUND OF THE INVENTION

It has been common for many years for consumers to pay bills by way of a personal check written by the consumer to the order of an entity and delivered to that entity by mail or in person. With the proliferation of computers interconnected to computer networks, particularly the Internet, consumers can now pay bills electronically. However until recently it was not possible for a consumer, using a computer terminal, to interact with a single payment system capable of paying all the consumer's bills whether by electronic means or by a paper check. Such a system now exists in the form of a consolidated bill payment system as described by Kight, et al. in U.S. Pat. No. 5,383,113, entitled SYSTEM AND METHOD FOR ELECTRONICALLY PROVIDING CUSTOMER SERVICES INCLUDING PAYMENT OF BILLS, FINANCIAL ANALYSIS AND LOANS.

Although the consolidated bill payment system described by Kight, et al. significantly advanced the state of the art, it did not focus on several problems which may arise in implementing a consolidated bill payment system capable of automatically paying consumer bills to merchants.

A typical state of the art electronic bill payment system is established by a financial institution or third party to provide subscribing customers with the capability to electronically pay registered merchants. Present day electronic bill payment systems operate in an integrated manner to collect payment requests electronically from consumers, process those requests to render them suitable for payment, and then pay the registered merchants, i.e., merchants listed in the system database. Hence, using present day systems, each has to establish relationships with both customers and merchants.

Developing and implementing a bill payment system has significant costs. First, a relationship has to be established with each merchant. Furthermore, special formatting requirements, and other rules and procedures required by each merchant for presenting payment data in a form the merchant system can process automatically must be determined and complied with. One of the features most desirable in any consolidated electronic bill payment system is that a consumer be allowed to pay any merchant to which the consumer owes a bill. Ultimately, this means that each conventional bill payment system may have hundreds of thousands of merchants in a database. Each bill payment entity must establish relationships with these merchants and comply with their special rules and procedures for the transfer of payment data. This is an expensive and time consuming process. Thus, it would be beneficial to provide a way to reduce the time and expense which must now be spent by every bill payment entity to implement a consolidated bill payment system.

Another problem is that consumers or data entry personnel sometimes make mistakes in entering payment data required by the bill payment system. Such a case arises when a consumer's account number with a merchant is incorrectly entered. The payment system must submit a correct account number to the merchant who will use this account number to associate the payment with the consumer. Thus, a technique is needed to validate the submitted consumer's account number.

A data entry person may also enter payment data which incorrectly specifies the merchant's name or parts of the merchant's address. It has been found that merchant information such as the merchant name, address, zip code are typically mangled at the data entry stage. It has been further observed that errors will often be made upon entry of the zip code. The merchant's name, address, and zip code is typically required by the payment system in order to, for example, retrieve merchant records from the merchant database. If this data is incorrect, the payment system may be unable to retrieve the correct merchant's record for processing a payment. Thus, a technique is needed to correctly identify a merchant record notwithstanding the submission of erroneous merchant data.

A consolidated bill payment system must also have the capability to properly remit payments to the same merchant at more than one remittance center. Commonly a large commercial merchant, (e.g., shoe company, Sears) will have several remittance centers distributed geographically so that customers can submit bills to a center within their location. Thus, a technique is required to ensure that consumer payments are remitted to the proper one of multiple remittance centers associated with the same.

Advantageously, a consolidated payment system must also be able to handle the different processing formats and requirements of numerous separate merchant accounting systems. For example, each merchant's account system may require payment information, such as consumer account numbers, in a format different than that submitted by the consumer. For example, many merchant accounting systems will only accept an account number with some portion of a consumer's last name or the consumer's zip code appended to the end of the account number presented by the customer.

A merchant account system may even require an altered consumer account number which uniquely identifies the consumer. For example, two consumers, e.g., spouses, may have identical account numbers, but the merchant accounting system may designate the account of each consumer uniquely, such as by combining the account number with the prospective customer's name. Additionally, it is not unusual for a merchant to have different account numbers for a single customer. For example, an account number on an invoice which goes out electronically may be different from an account number for the same customer which goes out as a paper transaction.

Thus, a consolidated bill payment system must be able to handle the various formats required by the merchant accounting system of each merchant. Accordingly, a technique is required to transform payment data received from the consumer into a form compatible with a merchant's accounting system.

OBJECTIVES OF THE INVENTION

Accordingly, it is an object of the present invention to provide an improved technique for automatically paying bills to any merchant on behalf of consumers.

It is a further object of the present invention to provide a technique which allows individual bill payment entities to implement consolidated bill payment system with greater efficiency.

It is a further object of the present invention to provide a technique for correcting erroneous bill payment data received from customers. In particular, it is an object of the present invention to correctly identify a merchant record based on received information which may include erroneous data.

It is still a further object of the present invention to provide a technique for furnishing payment information, including a payor's account number with a merchant, in a format acceptable to a particular merchant's accounting system.

It is another object of the present invention to provide a technique for validating a consumer's account number with a merchant.

It is another object of the present invention to provide a technique for ensuring payments are remitted to the proper remittance center.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY OF THE INVENTION

In order to solve the limitation of present art electronic bill payment systems, the present invention provides a method and apparatus for electronically processing bill payment requests where respective sets of payment requests are received electronically from a plurality of independent sources, each set of payment requests corresponding to an associated set of payors requesting payments to a plurality of payees. The payment requests are processed at a single remittance processing system having a database including payee information for each of the plurality of payees to generate payment directions for paying the plurality of payees in accordance with the processed payment requests.

A source may include any computer or network of computers capable of collecting payment requests from consumers, and may be, for example, a CheckFree processing center, a financial institution, or some other payment processing center. Typically a payment request would be a record containing whatever information is needed to process a particular payment.

Beneficially, the sets of payment requests from payors are sent from the sources to the bill payment system as batch files. Preferably, the bill payment system can normalize batch files received from the sources to correspond to a single normalized format.

In yet another aspect of the present invention, each of the received payment requests includes payor payment information, and the payment information other than a received zip code is processed to identify an eleven digit zip code for the payee to be paid. The database is then accessed by the eleven digit zip code to locate payee information on the payee to be paid.

In a still further aspect of the present invention, a payee has a plurality of payment remittance centers and a payment request includes information identifying a payor account number with the payee. The account number is processed to select one of the plurality remittance centers and payment is directed to the selected remittance center for the payee.

In a further aspect of the present invention, each of the payment requests includes a payor's account number with a payee. Alteration rules are stored corresponding to a payee account number format and one of the received account numbers is transformed into an altered account number according to the alteration rules.

PREFERRED EMBODIMENT(S) OF THE INVENTION

Figure 1:
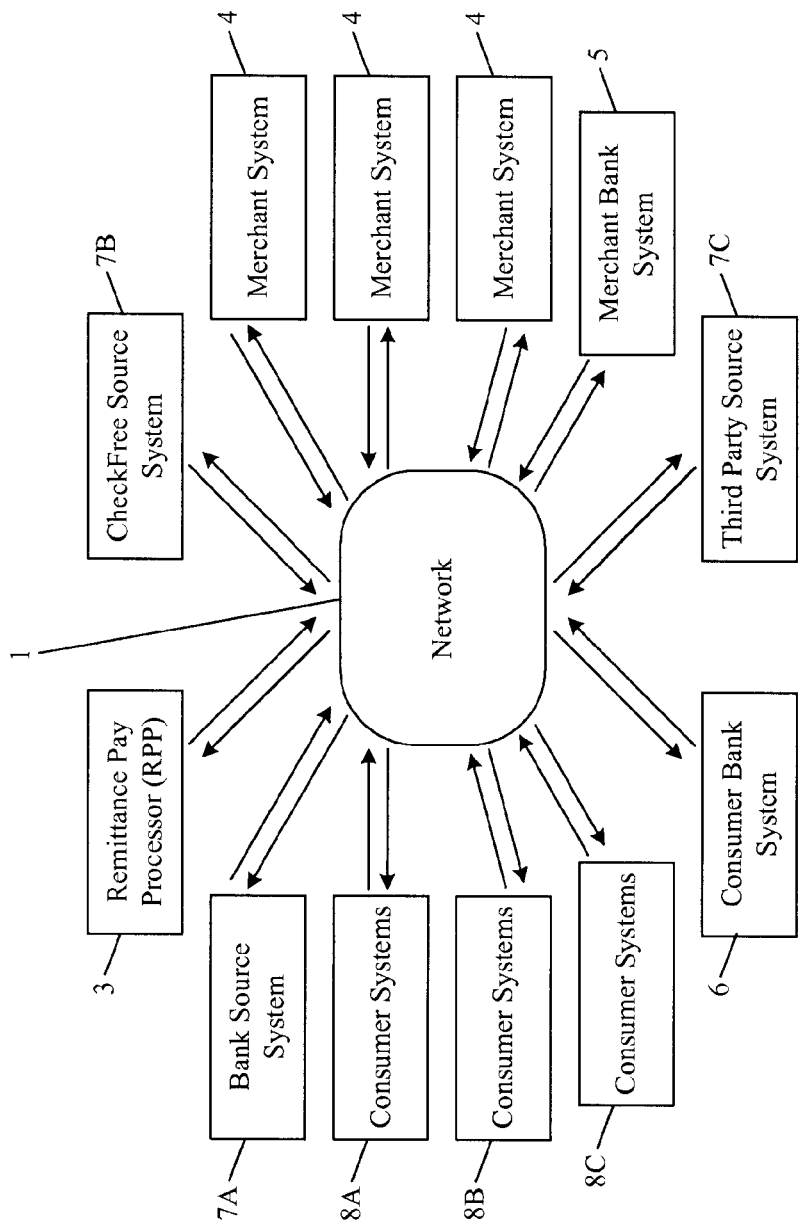
FIG. 1 is a system overview of an automated bill payment system in accordance with the present invention.

FIG. 1 generally depicts a bill payment system including consumer systems (i.e., payors) 8, merchant systems (i.e., payees) 4, source systems 7, a remittance payment processor (RPP) 3, merchant bank systems 5, and consumer bank systems 6.

A consumer system 8 provides the consumer (i.e. payor) with an interface to the RPP 3 via a source system 7 and typically would be a personal computer located at the consumer's residence, but could possibly be another electronic device such as a phone or specialized box containing bill payment software. A consumer is an individual or other entity, e.g., a corporation, for whom payments are actually made and whose account will be debited by the amount of the payment.

Source systems 7 represent any computer or network of computers capable of collecting payment requests from one or more consumer systems 8, and may be, for example, a CheckFree processing center 7B, a financial institution processing center 7A, or a third party payment processing center 7C.

Merchant systems 4 are computer systems typically owned by merchants for carrying out the bill payment process. Merchants are the persons or other entities to whom payments are made via the bill payment system on behalf of consumers. Merchants may include department stores, the phone company, the paper boy, a credit card company, as well as other persons and entities to whom payments are owed by one or more of consumers. Merchants have accounts with merchant bank systems 5 to which payments made on behalf of consumers are forwarded for deposit.

Consumer bank systems 6 either physically or electronically hold funds on account for consumers. These accounts are debited by the amount of any payments made to merchants on behalf of the consumers.

A network 1 connects the above-stated entities making communications between them possible. The network may be of any type capable of facilitating the flow of information among the various entities. It could, for example, be a public telecommunication network, the Internet, or other type of communication network. The network 1 may also be physically realized as one or more private or public networks. For example, in one possible embodiment, consumer systems 8 are coupled to a source systems 7 through one network and the source coupled to the RPP 3 through another separate network.

Figure 2A:
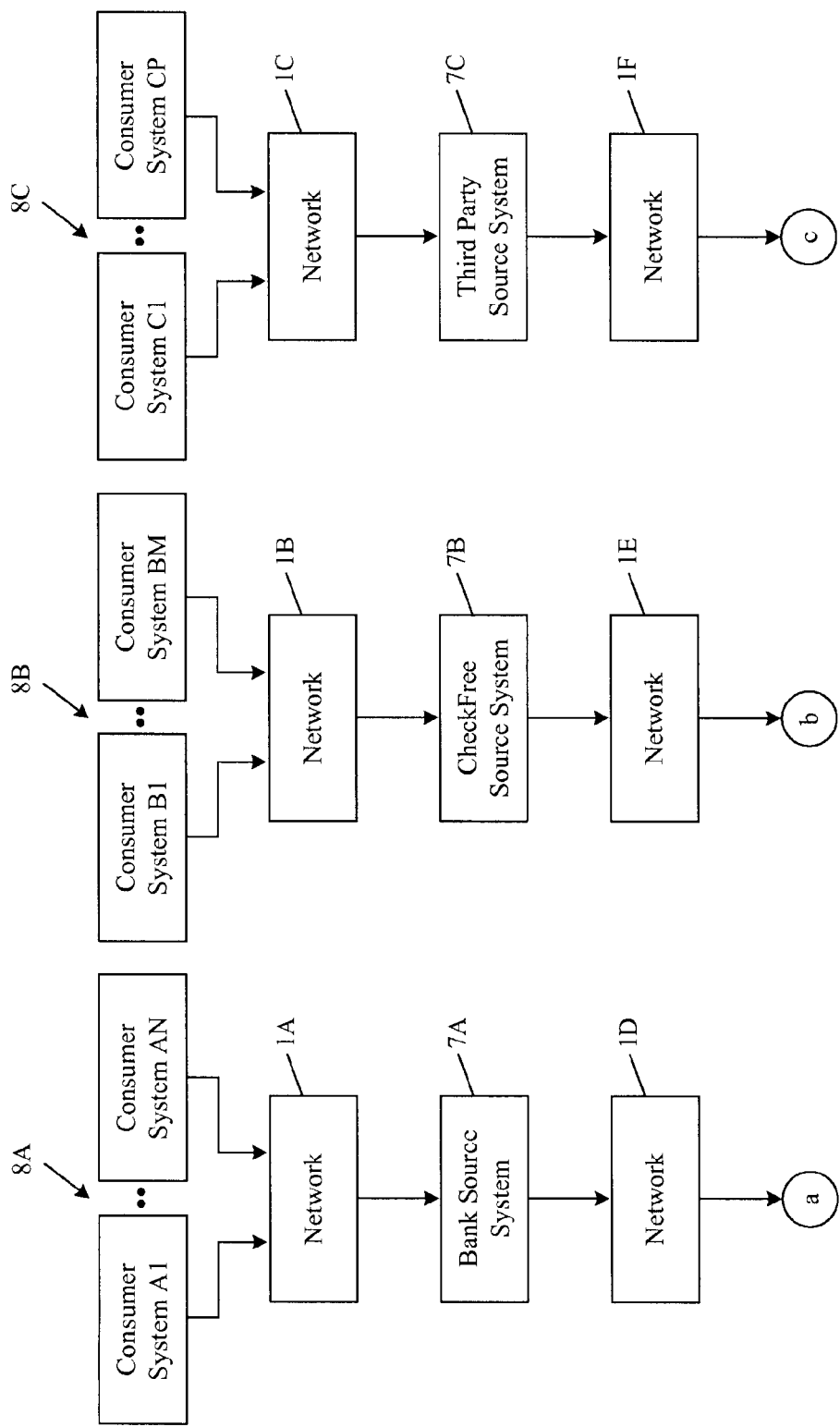
FIG. 2A is a diagrammatical representation of an electronic bill payment system according to the present invention.
Figure 2B:
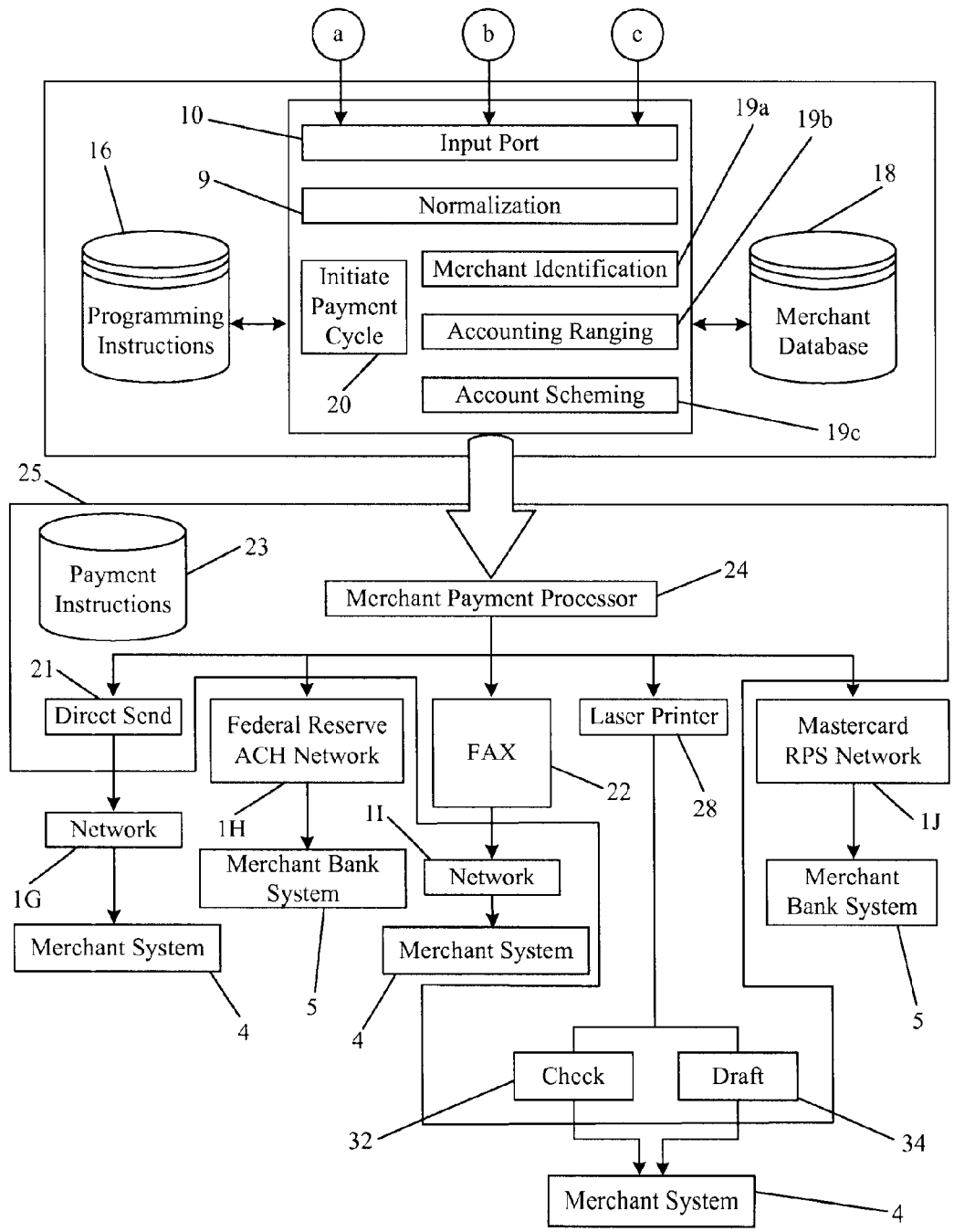
FIG. 2B is a diagrammatical representation of an electronic bill payment system according to the present invention.

FIGS. 2A-2B illustrate an overview of the process flow of a bill payment system. As shown in FIG. 2A, source systems 7A-C collect payment requests from consumer systems 8A-8C over networks 1A-1C. Typically, each source has its own consumer base of subscribed consumers. Thus, Referring to FIG. 2A, Bank Source System 7A collects payment requests from consumer system A1 through consumer system AN, denoted as consumer systems 8A, where there are N subscribed consumers, over network 1A. Similarly, CheckFree Source System 7B collects payment requests from consumer system B1 through consumer system BM, denoted as consumer systems 8B, where there are M subscribed consumers, over network 1B. Similarly, Third Party Source System 7C collects payment requests from consumer system C1 through consumer system CP, denoted as consumer systems 8C, where there are P subscribed consumers, over network 1C.

In FIG. 2A, each source is depicted as receiving payment requests from consumers over its own wide area network 1A-1C. However, other network configurations are possible. For example, the payment requests could be received over a single network, such as the Internet. Furthermore, the networks may be private or public (e.g., the Internet).

A payment request contains payment information for a consumer which will include several different types of information, such as the consumer account number, the merchant name, and the merchant address.

RPP 3 receives payment requests from each of the sources 7A-7C via networks 1D-1F. Typically, each source collects the payment requests, processes the requests into batch files, and transmits the batch files over networks 1D-1F. In FIG. 2A, each source is depicted as connected to the RPP 3 shown in FIG. 2B over a wide area network. However, other network configurations are possible including the possibility that networks 1D-1F are a single network, and the networks may be private or public (e.g., the Internet).

The RPP 3, as further detailed in FIG. 2B, includes a memory 16 storing programmed instructions for carrying out the functions of the RPP, a processor 17 for executing these instructions, and a merchant database 18 storing information associated with the merchants 4.

RPP 3 includes an input port 10 which accepts and collects together the payment requests from each of the respective sources 7. Preferably, RPP 3 also includes a normalization unit 9 which accepts the collected payment requests from input port 10, each payment request in a particular source's format and automatically converts the received format to a format compatible to the RPP 3. Thus, each source does not have to alter its own formatting or procedures in order to have payment requests processed by the RPP 3.

The RPP 3 processes the received payment information from the payment requests, and passes payment instructions to a merchant payment processing system 25 which processes the payment instructions in processor 24 in accordance with programmed instructions on memory 23, and makes payments to merchant systems 4 either directly or indirectly. It should be understood that the merchant payment processing system 25 could be multiple systems which respectively reside with each source 7, a single system (as shown) which resides with the RPP 3 or as a separate stand-alone system controlled by an entirely separate entity connected to the RPP 3 by a network. Hence each source processing system 7 collects payment requests made by consumers in its consumer base and the one or more merchant payment systems 25 makes payments on behalf of these consumers 8 in accordance with payment directions from the centralized RPP 3.

Payment is made from the payment processor 25 to merchant system 4 or merchant bank system 5 electronically through networks 1G-1J, or alternately can be transmitted by paper through checks 32 and drafts 34. Payment advice reflecting the payment can also be directly sent by network 1G to merchant system 4. The payment information is presented to the applicable merchant electronically in a form that the merchant system 4 can process to update the merchant's records.

As shown in FIG. 2B, one possible mode of payment to a merchant via merchant bank 5 is electronic funds transfer through the Federal Reserve Automated Clearing House (ACH) Network 1H. Another electronic payment avenue is through the MasterCard RPS Network 1J. Additionally, payment can also be made non-electronically to a merchant by a check 32 or a draft 34 printed on laser printer 28. Payment advice can alternatively be delivered through Fax 22 or through the telephone network 1I. Thus, by the above described process, the bill payment system of the present invention pays bills to merchants according to payment requests received by customers through multiple sources.

Now taking a closer look at the RPP processor 17, the RPP stores or processes several different record types necessary to the bill payment process. A merchant record contains all necessary information needed to forward a payment. This includes a merchant name, address, and zip code. A consumer record includes a consumer name, address, zip code, and consumer account number. A payment record will contain information related to payment, including payee identification, consumer identification, and the dollar amount of the transaction. The merchant records are stored in a merchant database 18. All other records as well as programmed instructions which direct the operation of the RPP are stored in a memory 16. The memory 16 could also store the merchant database 18 if desired.

After receiving payment requests from sources 7, the RPP 3 periodically initiates a payment cycle 20 which process the records to generate information which will be used by the payment processing system 25 to credit merchant accounts and advise the merchant systems of the payments. The processing flow of the billing cycle contains, in addition to other processes, three particularly important processes necessary for successful processing of each payment request. These processes are merchant identification 19a, account ranging 19b, and account scheming 19c, typically performed in this order. In the first step of processing a payment request, the processor 17 attempts to identify a merchant in the merchant database 18 based on information in the payment request. In the second step, the processor 17 will attempt to determine a remittance center of the merchant to which the payment and/or payment information is to be sent. If a candidate remittance center is identified, the system enters the third stage of processing, account scheming. In account scheming, the processor 17 attempts to normalize a user account with a merchant according to the merchant's rules. If account scheming fails, the system will return to the account ranging process to attempt to identify another candidate remittance center, and from there, again into account scheming.

Although the above described payment cycle is a preferable embodiment of the RPP, a payment cycle can include merchant identification 19*a*, account ranging 19*b*, and/or 19*c*, in any order or combination. In addition, these processes may be performed independently, and could be performed individually outside the RPP. These three processes will now be described in further detail herein referring to FIGS. 3-6.

Figure 3:
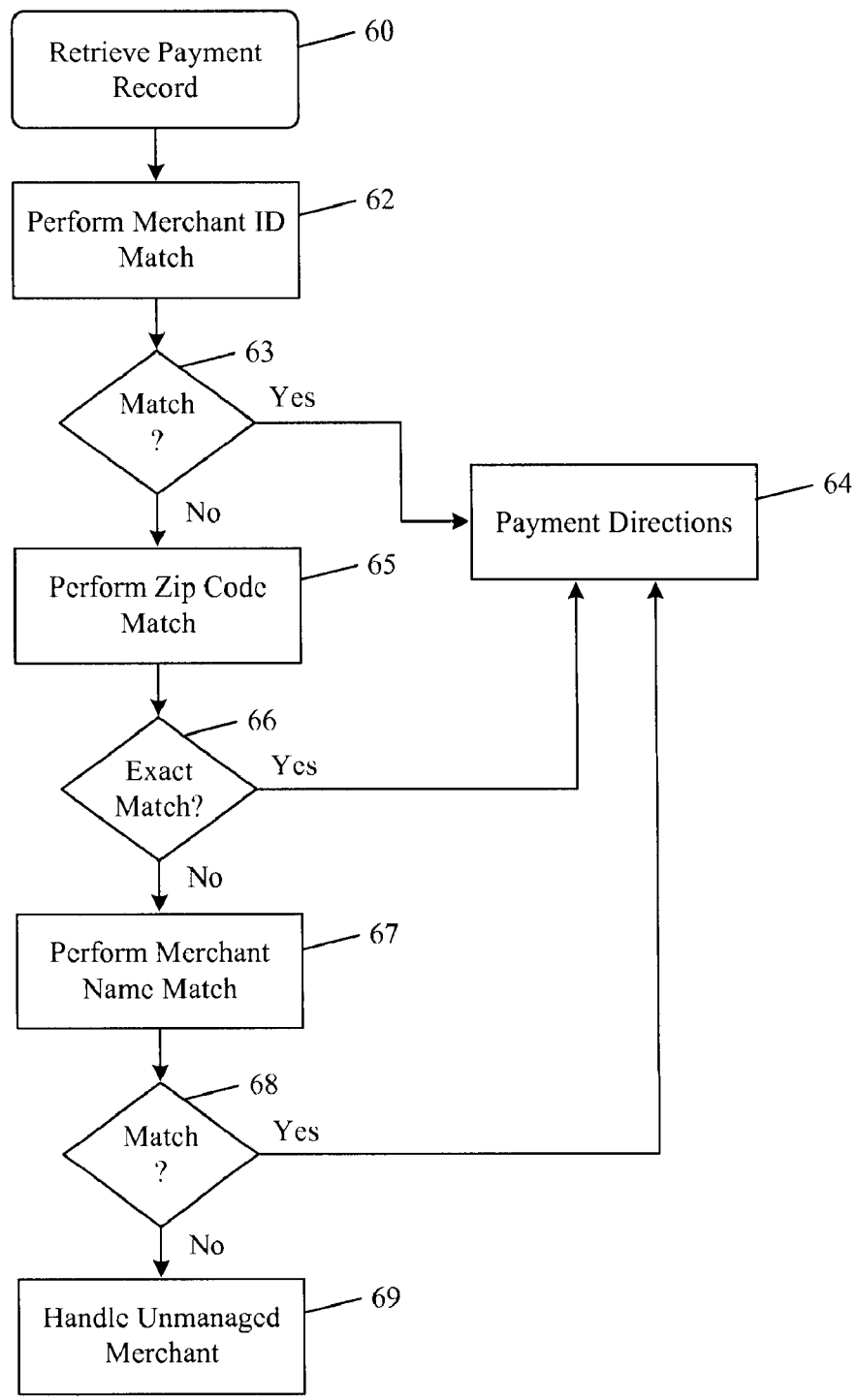
FIG. 3 is a flow chart illustrating merchant identification in accordance with the present invention.

FIG. 3 illustrates merchant identification. Using merchant identification, the RPP 3 is able to retrieve the correct merchant record from merchant database 18 based on a consumer's payment request submitted with possibly erroneous merchant name and address information, e.g., street address, city, state, zip code. It has been observed that data entry operators will often make errors in the merchant's street address and zip code. The RPP 3 is capable of mapping the mangled merchant information supplied in the payment request into the proper merchant record in the merchant database 18 notwithstanding the errors in the merchant information. Merchant identification as described herein, can be used in any implementation where merchant information is likely to contain errors and must be mapped into an existing merchant record in the merchant database.

RPP 3 initiates merchant identification by step 60 which retrieves a payment record from one of the payment records previously submitted by the source 7. At step 62, the RPP first attempts to retrieve a merchant record from the merchant database 18 by matching the merchant id included in the payment record against the records of the merchant database 18. If there is a match, then at step 63 processing of the payment record continues to the payment directions stage 64. The payment directions stage is where the RPP determines where to send payments. This stage includes account ranging discussed below which determines the remittance center to which payment gets sent. If there is no match at step 63, the RPP continues to step 65. At step 65, the RPP maps the merchant's merchant name and address, excluding the provided street address and zip code, into an eleven digit zip code. That is, the RPP produces an eleven digit zip code based on merchant name, city, and state in the payment information. In order to avail the merchant information which the inventors have determined to be mostly likely to contain errors, the received merchant street address and zip code are not considered. Hence, in step 65 the RPP 3 identifies an eleven digit zip code based only on the merchant's name, city, and state.

Figure 4:
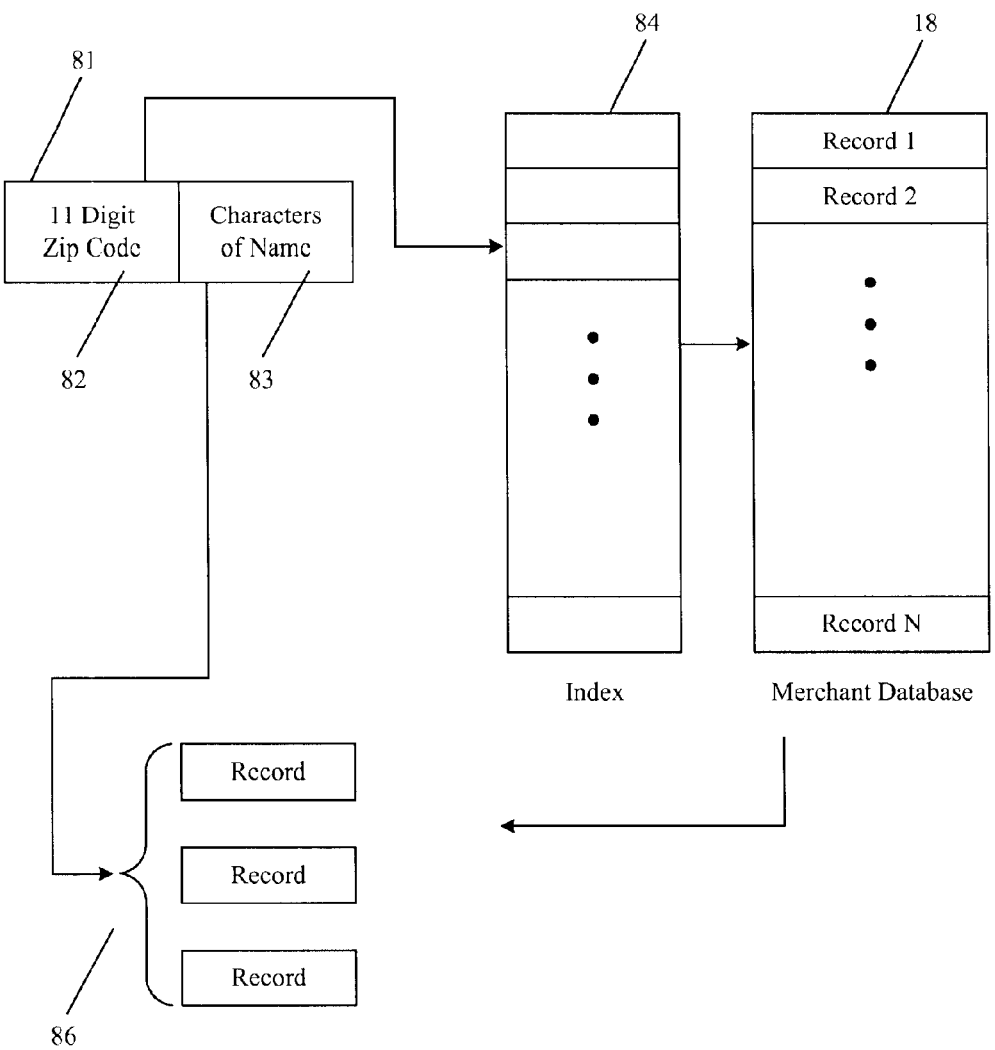
FIG. 4 is a block diagram illustrating accesses to the merchant database during merchant identification in accordance with the present invention.

Step 65 of merchant identification uses the indexing structure shown in FIG. 4 to access one or more records from the merchant database 18. In step 65, referring to FIG. 4, the RPP 3 forms an 11 digit zip code index 82 and compares this index to index 84 in order to retrieve a merchant record in merchant database 18. It may be possible that there is more than one merchant at a location identified by an eleven digit zip code. For example, there could be a remittance processing center on the floor of the building identified by the eleven digit zip code which handles payments for several merchants 4. In such a case, the RPP differentiates the correct merchant record from other possibly correct merchant records associated with the same eleven digit zip code by, after identifying merchant records indexed to the same eleven digit zip code, comparing some portion of the merchant's name, e.g., the first five characters with the characters of each merchant's name which has been combined with the application zip code in the merchant index. The RPP 3 is thereby able to uniquely identify the proper merchant record.

If step 65 identifies a unique merchant record then there is an exact match and at step 66 processing continues to step 64. However, if step 65 retrieves more than one merchant forming a group of records 86, (see FIG. 4) then at step 66 processing continues to step 67. At step 67, the RPP 3 will attempt to match one or more characters of the merchant's name 83 against the records 86 to identify a merchant record. If a match is found, processing continues at step 68 to the payment directions stage 64. If there is no match, then at step 68 the program will continue to step 69 where the RPP will handle the unmanaged merchant. If there is no merchant, the system may have provisions at step 69 for adding the merchant to the merchant database 18.

Figure 5:
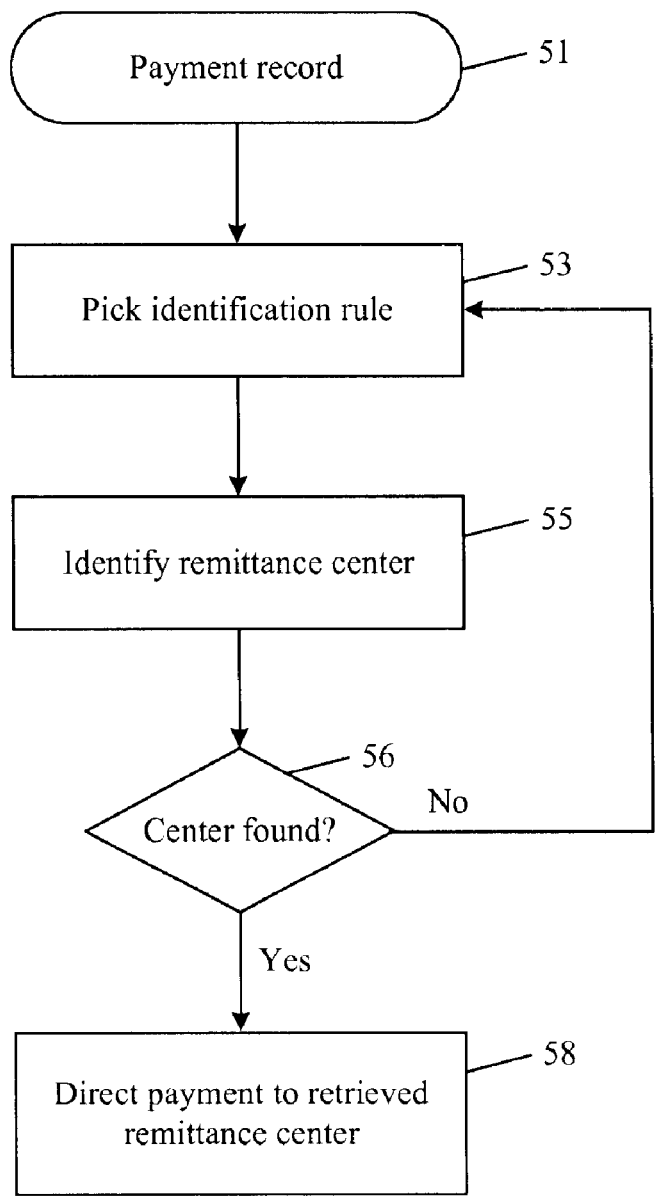
FIG. 5 is a flow chart illustrating account ranging in accordance with the present invention.

FIG. 5 illustrates a payment direction stage, as performed in the preferred embodiment of the present invention, in which the RPP attempts to determine a remittance center to which payment is sent. The RPP determines a remittance center based on one or more of the following identification rules: 1) length of account number, 2) merchant zip code, 3) merchant name, and 4) account ranging. Each rule has in common that it identifies the remittance center based on some factor of the payment information.

In FIG. 5, the RPP 3 processes the payment record presented in step 51 to determine one of a plurality of remittance centers associated with the applicable merchant in which to make payment. In step 53, the RPP chooses one of the above-mentioned four rules and at step 55 attempts to identify a remittance center. If a remittance center is found at step 56, then the RPP directs payment to that remittance center 58. If the RPP is unsuccessful in determining a remittance center, the RPP cycles back to step 53 and picks a new rule for identification. By this process, the system cycles through all combinations of rules that identify remittance centers for the merchant.

In account ranging, the correct remittance center is determined based on some characteristic of the consumer's account number. Typically a large merchant, such as credit card company will have multiple remittance centers to which respective consumer payments must be submitted. The payment record contains information which may be used to identify a remittance center besides an account number, such as an area code of the payor's telephone number. A telephone phone utility might include each consumer's area code in the consumer's account number and require payments from all consumers within a particular area code be directed to a particular one of multiple remittance centers. A credit card company may require that payments from all consumers having the same first six digits in their account numbers be made to the same remittance center.

The payment direction process illustrated in FIG. 5 is a preferred embodiment for determining payment direction. In this embodiment, the payment direction process includes account ranging as one of four possible methods of identifying a remittance center. However, in other embodiments, account ranging may be used in different combinations, or independently.

Figure 6:
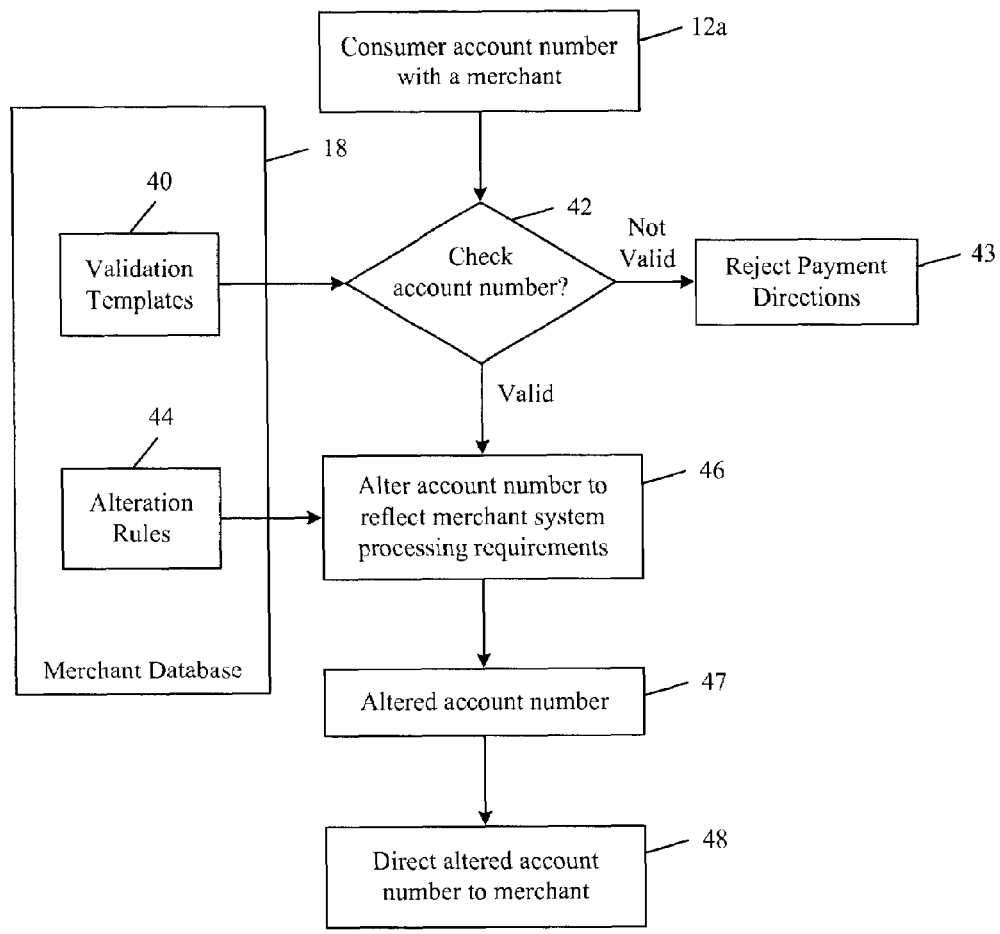
FIG. 6 is a flow chart illustrating account scheming in accordance with the present invention.

FIG. 6 illustrates the steps for account scheming. In certain cases, the consumer account number received by the RPP as part of the payment information may contain errors. Hence, the RPP has no way of checking the account number against a previously stored account number associated with the applicable consumer to verify the accuracy of the received information.

Using account scheming, the RPP receives, in step 12a, the consumer account number as part of the payment record. In step 42, the RPP checks to validate the account number. Then in step 46, the RPP alters the account number to correspond to a format required by a merchant's system 4 for processing.

More particularly, the RPP validates and alters the consumer account number by storing separate business rules for each merchant which identify the expected general format for any consumer account number associated with that merchant. These business rules are stored as validation templates 40 in merchant database 18 for each merchant. The account number received from the consumer is checked against the validation template to validate that the account number conforms to the general account number format to which an account number associated with the applicable merchant must conform. For example, the validation template for a merchant such as a credit card company may require an account number begin with the numbers "43" and be 18 digits long. Additionally, for some merchants the validation template will have check digit requirements. That is, the validation template can be used to confirm that the received consumer account number conforms to a check digit after being run through a specific algorithm.

In operation, the RPP 3 performs, in accordance with programmed instructions stored on the memory 16, the validation procedure by comparing in step 42 the received consumer account number for the applicable merchant received in step 12a with the validation template, say 40, for that merchant to test the validity of the account number. If that account number is not valid, the payment directions are rejected as not valid in step 43; otherwise, the account number is considered valid.

Once the account number has been validated, it is then modified in step 46 so as to conform to alteration rules 44 for the applicable merchant. The alteration rules 44 are also stored in database 18. The alteration rules 44 relate to the format of the consumer's account number in which the applicable merchant system requires to process a consumer's payment. Typically, alteration rules would specify an altered account number which includes a portion of a payor's name with the account number, a portion of the payor's address with the account number, or a portion of the payor's zip code with the account number. Alteration by the RPP 3 involves notifying the received account number which will be furnished, along with payment, to the merchant. For instance, some merchant systems require that the consumer's account number always end in "120". Hence, in such a case, the RPP 3, in accordance with programmed instructions stored on the memory 16, modifies the received account number to append "120" to the end of the alpha-numeric sequence of the received account number. Once the account number has been modified so as to conform to the format required by the merchant system, the altered account number 47 is then transmitted from the RPP 3 to the merchant 4 via the network 1, along with the payment, in step 48.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, e.g. a bill payment system, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A computer-implemented method comprising:
transmitting, by a source system to a remittance processing system, a payment request on behalf of a payor;
responsive to the transmission of the payment request, receiving, by the source system from the remittance processing system, at least one payment instruction generated by the remittance processing system, wherein the generation of the at least one payment instruction includes the remittance processing system (i) identifying a payee in a merchant database based, at least in part, on information in the payment request, (ii) retrieving information associated with the payee from the merchant database, and (iii) altering an account number associated with the payment request according to at least one alteration rule associated with the payee, and wherein the at least one payment instruction includes the retrieved information or the altered account number; and
issuing, by the source system, a payment associated with the payment request in accordance with the at least one payment instruction received from the remittance processing system, wherein the payment is made to the identified payee and includes the altered account number,
wherein the above steps are performed by one or more computers associated with the source system.

2. A system comprising:
receiving means for receiving, by a source system a payment request on behalf of a payor;
generating means for generating, responsive to receiving the payment request, at least one payment instruction, wherein the generation of the at least one payment instruction includes (i) identifying a payee in a merchant database based, at least in part, on information in the payment request, (ii) retrieving information associated with the payee from the merchant database, and (iii) altering an account number associated with the payment request according to at least one alteration rule associated with the payee, and wherein the retrieved information is included in the at least one generated payment instruction; and
transmitting means for transmitting, to the source system the at least one payment instruction, wherein the source system issues a payment associated with the payment request in accordance with the at least one payment instruction, and wherein the payment is made to the identified payee and includes the altered account number.

3. A system comprising:
a communications interface;
a processor in communication with the communications interface, wherein the processor is configured to execute software instructions to:
transmit, via the communications interface to a remittance processing system, a payment request on behalf of a payor;

responsive to the transmission of the payment request, receive, via the communications interface from the remittance processing system, at least one payment instruction generated by the remittance processing system, wherein the generation of the at least one payment instruction includes the remittance processing system (i) identifying a payee in a merchant database based, at least in part, on information in the payment request, (ii) retrieving information associated with the payee from the merchant database, and (iii) altering an account number associated with the payment request according to at least one alteration rule associated with the payee, and wherein the at least one payment instruction includes the retrieved information or the altered account number; and issue a payment associated with the payment request in accordance with the at least one payment instruction received from the remittance payment processor, wherein the payment is made to the identified payee and includes the altered account number.

4. A system comprising:

transmitting means for transmitting, to a remittance processing system, a payment request on behalf of a payor;

receiving means for receiving, from the remittance processing system, responsive to the transmission of the payment request, at least one payment instruction generated by the remittance processing system, wherein the generation of the at least one payment instruction includes the remittance processing system (i) identifying a payee in a merchant database based, at least in part, on information in the payment request, (ii) retrieving information associated with the payee from the merchant database, and (iii) altering an account number associated with the payment request according to at least one alteration rule associated with the payee, and wherein the at least one payment instruction includes the retrieved information or the altered account number; and issuing means for issuing a payment associated with the payment request in accordance with the at least one payment instruction received from the remittance payment processor, wherein the payment is made to the identified payee and includes the altered account number.

5. A computer-implemented method comprising:

receiving, by a remittance processing system from a source system, a payment request on behalf of a payor;

responsive to receiving the payment request, generating, by the remittance processing system, at least one payment instruction, wherein the generation of the at least one payment instruction includes (i) identifying a payee in a merchant database based, at least in part, on information in the payment request, (ii) retrieving information associated with the payee from the merchant database, and (iii) altering an account number associated with the payment request according to at least one alteration rule associated with the payee, and wherein the at least one payment instruction includes the retrieved information or the altered account number; and transmitting, by the remittance processing system to the source system, the at least one payment instruction, wherein the source system issues a payment associated with the payment request in accordance with the at least one payment instruction, and wherein the payment is made to the identified payee and includes the altered account number, wherein the above steps are performed by a computer processor associated with the remittance processing system.

6. A system comprising:

a communications interface;

a processor in communication with the communications interface, wherein the processor is configured to execute software instructions to:

receive, via the communications interface from a source system, a payment request on behalf of a payor;

generate, responsive to receiving the payment request, at least one payment instruction, wherein the generation of the at least one payment instruction includes (i) identifying a payee in a merchant database based, at least in part, on information in the payment request, retrieving information associated with the payee from the merchant database, and (iii) altering an account number associated with the payment request according to at least one alteration rule associated with the payee, and wherein the at least one payment instruction includes the retrieved information or the altered account number; and transmit, via the communications interface to the source system, the at least one payment instruction, wherein the source system issues a payment associated with the payment request in accordance with the at least one payment instruction, and wherein the payment is made to the identified payee and includes the altered account number.

7. The computer-implemented method of claim 1, wherein the generation of the at least one payment instruction further includes the remittance processing system determining a remittance center of the payee to which the payment is to be sent, and wherein the payment is directed to the determined remittance center.

8. The computer-implemented method of claim 1, wherein the issued payment is an electronic credit transmitted from the source system to an external entity.

9. The system of claim 3, wherein the generation of the at least one payment instruction further includes the remittance processing system determining a remittance center of the payee to which payment is to be sent, and wherein the payment is directed to the determined remittance center.

10. The system of claim 3, wherein the issued payment is an electronic credit transmitted by the processor via the communications interface to an external entity.

11. The computer-implemented method of claim 5, wherein the generation of the at least one payment instruction further includes determining a remittance center of the payee to which payment is to be sent, and wherein the payment is directed to the determined remittance center.

12. The computer-implemented method of claim 5, wherein the issued payment is an electronic credit transmitted from the source system to an external entity.

13. The system of claim 6, wherein the generation of the at least one payment instruction further includes determining a remittance center of the payee to which payment is to be sent, and wherein the payment is directed to the determined remittance center.

14. The system of claim 6, wherein the issued payment is an electronic credit transmitted from the source system to an external entity.

15. The computer-implemented method of claim 5, wherein identifying the payee in the merchant database based, at least in part, on information in the payment request of the set of payment requests includes generating an eleven-digit zip code from the information in the payment request of the set of payment requests and searching for stored information associated with the payee using at least the eleven-digit zip code.

16. The system of claim 6, wherein the identification of the payee in the merchant database based, at least in part, on information in the payment request of the set of payment requests includes generating an eleven-digit zip code from the information in the payment request of the set of payment requests and searching for stored information associated with the payee using at least the eleven-digit zip code.

17. The computer-implemented method of claim 1, wherein identifying the payee in the merchant database based, at least in part, on information in the payment request of the set of payment requests includes generating an eleven-digit zip code from the information in the payment request of the set of payment requests and searching for stored information associated with the payee using at least the eleven-digit zip code.

18. The system of claim 3, wherein the identification of the payee in the merchant database based, at least in part, on information in the payment request of the set of payment requests includes generating an eleven-digit zip code from the information in the payment request of the set of payment requests and searching for stored information associated with the payee using at least the eleven-digit zip code.

* * * * *